United States Patent Office 3,677,978
Patented July 18, 1972

3,677,978
METAL SALT COMPLEXES OF IMIDAZOLES AS CURING AGENTS FOR ONE-PART EPOXY RESINS
Rostyslaw Dowbenko, Wen-Hsuan Chang, and Carl C. Anderson, Gibsonia, Pa., assignors to PPG Industries, Inc., Pittsburgh, Pa.
No Drawing. Continuation-in-part of application Ser. No. 702,531, Feb. 2, 1968. This application Aug. 23, 1971, Ser. No. 174,244
Int. Cl. C08g 23/14, 30/14
U.S. Cl. 260—2 EP
12 Claims

ABSTRACT OF THE DISCLOSURE

Epoxy resins are blended with metal salt complexes of imidazoles to form compositions which remain in the uncured state for long periods of time at room temperature and cure conveniently at elevated temperatures. These epoxy resin compositions may be used as coatings, adhesives, potting compounds, castings and laminates.

CROSS-REFERENCE TO RELATED APPLICATIONS

This application is a continuation-in-part of our copending application Ser. No. 702,531, filed Feb. 2, 1968, and now abandoned.

One of the most important problems in the use of epoxy resins in coatings, adhesives or other applications is that of finding an acceptable one-part epoxy composition that is stable in storage. Using the conventional epoxy adhesives and coatings, it has been necessary to employ two-part systems wherein the epoxy compound and curing agent are kept in separate containers until shortly before use. This is due to the lack of stability of the adhesive or coating composition. That is, although the epoxy resin with the curing agent already incorporated can cure rapidly to a tough, infusible state when subjected to higher temperatures, the resins cure prematurely at normal room temperatures with the passing of time and hence may not be stored for reasonable periods of time prior to use. This two-part system is undesirable since shipping both components separately involves considerably more time and expense and inconvenience to the ultimate user of the epoxy resin, and mixing the two components at the time of use leads to difficulty in accurately measuring the components and thus to products with less than optimum properties.

Imidazoles are known to be very fast curing agents for epoxy resins, and compositions of the imidazoles and epoxy resins yield coatings and adhesives having excellent mechanical properties. However, these imidazoles completely lack stability in mixtures with epoxy resins at room temperature for long periods of time, and this makes them useless as curing agents for one-part epoxy coatings or adhesives.

It has now been found that complexes of imidazoles with metal salts may be blended with epoxy resins to form a one-part coating or adhesive which cures rapidly when subjected to elevated temperatures but will not cure or become viscous when stored at room temperature for long periods of time. The coatings and adhesivs cure to a tough, infusible state and prior to curing may be sold or transported in one package.

The complexes employed in the invention can be formed from essentially any imidazole or mixtures of imidazoles. By the term "imidazole" is meant imidazole itself or any substituted imidazole. Examples of substituted imidazoles that may be used include alkyl imidazoles, such as 1-methylimidazole, 1,2-dimethylimidazole, 2-methylimidazole, 2-ethylimidazole and 2-ethyl-4-methylimidazole; carbamyl-alkyl-substituted imidazoles, such as 1-(2-carbamylethyl) imidazole and 1-(2-carbamylethyl)-2-ethyl 4-methylimidazole; alkaryl-substituted imidazoles, such as 1-benzyl-2-methylimidazole and 1-phenyl-2-methylimidazole; alkenyl-substituted imidazoles such as 1-vinyl-2-methylimidazole; allyl-substituted imidazoles such as 1-allyl-2-ethyl - 4 - methylimidazole; carboxanilide-substituted imidazoles, such as 1-imidazolecarboxanilide and 2-methyl-1-imidazocarboxanilide; imidazole addition products with alpha,beta ethylenically-unsaturated compounds such as acrylates, such as alkyl acrylates, allyl acrylates, hydroxyethyl acrylates, acrylic acid, acrylamide and acrylonitrile; polycyclic imidazoles, such as benzimidazoles, naphthimidazoles; polyimidazoles, such as the condensation product of azaleic acid with o-phenylenediamine, tricarbohydroxyethyl amine with o-phenylenediamine and others, such as 1-(p-toluenesulfonyl)-imidazole and 2,4,6-tris(1-imidazolyl)-s-triazine. It is noted that even resinous compositions containing imidazole fragments may be used. It is further noted that complexes of mixed imidazoles, such as metal salts with imidazole and 1-methylimidazole and others may also be used.

Essentially any metal salt/imidazole complex may be used to cure epoxy resins. Examples of metal salts are copper salts such as cupric chloride, cuprous chloride, cupric bromide, cupric fluoride, cupric nitrate, cupric fluoborate, and cupric sulfate, cupric acetate, cupric trifluoroacetate, cupric methacrylate, cupric stearate, cupric octoate, cupric malonate, cupric benzoate; nickel salts such as nickel chloride, nickel fluoride, nickel sulfate and nickel fluoborate, nickel tallate, nickel stearate and castor oil acid salts of nickel, calcium salts such as calcium chloride and calcium bromide; cobalt salts such as cobaltous chloride, cobaltous fluoride, cobaltous sulfate, cobaltous stearate, cobaltous octoate and cobaltous fluoborate; zinc salts such as zinc bromide, zinc stearate, zinc octoate, zinc-2-ethylhexoate, zinc chromate and zinc chloride; mercury salts such as mercuric bromide and mercuric chloride; zirconium salts such as zirconium sulfate; indium salts such as indium fluoborate; silver salts such as silver nitrate; chromium salts such as chromic chloride; manganese salts such as manganese chloride and manganese sulfate; tin salts such as stannous chloride; cadmium salts such as cadmium chloride; iron salts such as ferrous chloride, titanium salts such as titanium chlorides, vanadium salts such as vanadium chloride, antimony salts such as antimony chloride, and the like. The nickel and copper salts are the preferred embodiments, as they are readily available metal salts.

The metals salts may contain any of the metals in Groups I–B, II–A, II–B, III–A, IV–A, IV–B, V–A, V–B, VI–B, VII–B, and VIII of the periodic chart of the elements. The periodic chart may be found in Handbook of Chemistry and Physics, published by Chemical Rubber Publishing Co., 39th edition, on pages 400 and 401.

It is to be understood that the above metal salts are but a few of the metal salts that may be used.

The metal salt to imidazole molar ratio is not critical. Generally, however, the metal salt to imidazole molar ratio is between about 1:1 and about 1:6.

The complexes of imidazoles and metal salts are conveniently formed by mixing the ingredients. If any of the ingredients are solids, solutions of the reactants in a solvent such as methanol or water may be used. If the product is solid, one may filter the resulting precipitate to obtain the complex.

The compositions included in this invention are epoxy resins with the above-mentioned imidazole metal salt complexes as curing agents. The compositions may be formed by merely mixing the imidazole complex with the epoxy resins, with or without the use of solvents, and the ingredients may be mixed together at room temperature.

Any epoxy resin may be cured by blending the epoxy with the metal salt complex of imidazoles and heating the blend from about 200° F. to about 500° F. The epoxy

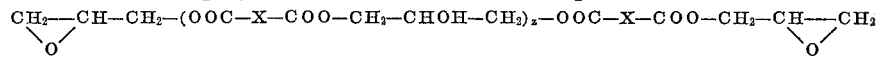

resins may be saturated or unsaturated, cycloaliphatic, heterocyclic or aliphatic and may be substituted, if desired, with substituents such as halogen atoms, sulfur atoms, esters, urethanes, amino groups, hydroxyl groups, ether radicals, mercapto groups, acids, anhydrides, ketones, aldehydes and the like. They may also be monomeric or polymeric. They may also be used in the presence of compounds or resins containing halogen atoms, sulfur atoms, hydroxy groups, mercapto groups, ether radicals, amino groups, acid groups, anhydrides, esters, urethanes, ketones, and aldehyde groups.

The term "epoxy resin" used herein applies to monoepoxides as well as to polyepoxides. Monoepoxides polymerize when blended with the metal salt complexes of imidazoles and heated. Examples of monoepoxides which polymerize upon the addition of metal salt complexes of imidazoles and heat are propylene oxide, allyl glycidyl ether, phenyl glycidyl ether, pentachlorophenyl glycidyl ether, tetrabromophenyl glycidyl ether, glycidyl methacrylate and the like.

In the preferred embodiments of this invention, the epoxy resins are polyepoxides having an average of more than 1.0 1,2-epoxy groups per average molecular weight. Among the polyepoxides which can be used herein are the polyglycidyl ethers of polyphenols, such as Bisphenol A. These may be attained, for example, by etherification of a polyphenol with epichlorohydrin or dichlorohydrin in the presence of an alkali. The phenolic compound may be 2,2-bis(4-hydroxyphenyl)propane, 4,4'-dihydroxybenzophenone, 1,1-bis(4-hydroxyphenyl)ethane, 2,2-bis(4-hydroxy-tertiarybutylphenyl)propane, bis(2-hydroxynaphthyl)methane, 1,5-dihydroxynaphthalene, or the like. The polyphenol can also be a novolak resin or a similar polyphenol resin.

Such polyglycidyl ethers of polyphenols correspond to the average formula:

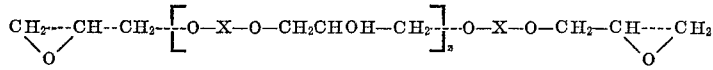

in which X represents an aromatic radical and z represents a whole or fractional small number.

Examples of this class of polyepoxides are the reaction products of Bisphenol A and epichlorohydrin, which correspond to the structure:

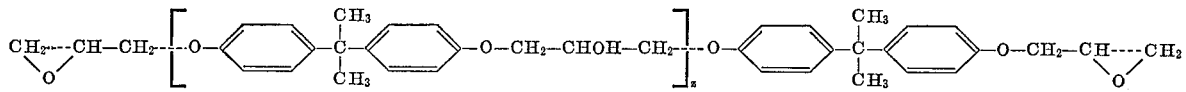

in which z represents a whole or fractional small number.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 2,4,6-hexanetriol, glycerol, trimethylolpropane, and the like.

Other examples of polyepoxides that may be used in this invention are the partial fatty acid esters of the above-mentioned glycidyl polyethers of polyhydric alcohols and glycidyl polyethers of polyhydric phenols. Linseed oil and castor oil are examples of fatty acids that may be used to produce these resins.

Also suitable are polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, adipic acid, azelaic acid, phthalic acid, isophthalic acid, terephthalic acid, 2,5-naphthalenedicarboxylic acid, dimerized linolenic acid, and the like. Examples are diglycidyl adipate and diglycidyl phthalate, and similar esters which correspond to the formula:

$$CH_2-CH-CH_2-(OOC-X-COO-CH_2-CHOH-CH_2)_z-OOC-X-COO-CH_2-CH-CH_2$$
$$\diagdown O \diagup \qquad\qquad\qquad\qquad\qquad\qquad\qquad\qquad\qquad\qquad \diagdown O \diagup$$

in which X represents a hydrocarbon radical, such as a phenyl or other aromatic radical or an aliphatic radical, and z represents a whole or fractional small number.

Other examples are polyepoxides derived from the epoxidation of olefinically unsaturated aliphatic compounds. Included are diepoxides and higher epoxides, as well as mixtures of epoxides comprising in part one or more monoepoxides. These polyepoxides are non-phenolic and are obtained by epoxidation of olefins such as butadiene and cyclohexene, for example, by oxygen and selected metal catalysts, by perbenzoic acid, by acetaldehyde monoperacetate, or by peracetic acid.

Among the polyepoxides derived from the epoxidation of alicyclic compounds are those of the formula:

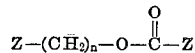

wherein $n$ is a small whole number, e.g., from 1 to 8, and Z is a radical of the structure:

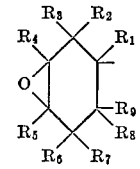

where $R_1$ through $R_9$ are hydrogen or lower alkyl radicals, i.e., having up to about 8 carbon atoms. Examples of these polyepoxides are described in U.S. Pat. No. 2,716,123.

There may also be employed the corresponding diesters of the formula:

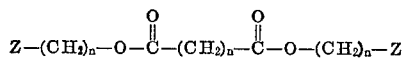

where $n$ and Z are as above. Products of this type may be produced, for example, by reducing the cyclic unsaturated aldehyde from the Diels-Alder reaction of crotonaldehyde and butadiene (or similar reactants) to the corresponding alcohol and reacting 2 moles of this alcohol with 1 mole of sebacic acid or a similar dicarboxylic acid.

Other polyepoxides from the epoxidation of olefinically unsaturated alicyclic compounds are those of the formula:

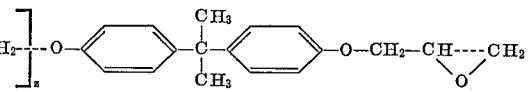

where Z and $n$ are as above and the group $(C_mH_{2m-1}O)$ is an epoxyalkyl group, preferably having from 8 to 16 carbon atoms. These compounds may be produced by the epoxidation of a 3-cyclohexenylalkyl ester of a monounsaturated fatty acid, for example, with peracetic acid. Examples of these compounds are disclosed in U.S. Pat. No. 2,786,066.

Higher epoxides are produced from the similar reaction of 3-cyclohexenylalkyl esters of polyunsaturated fatty acids, and these can also be employed in the invention. These include, for example, the polyepoxides of U.S. Pat. No. 2,786,067 and others having the formula:

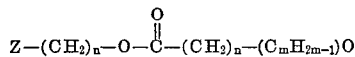

where Z and $n$ are as above and $(C_mH_{2m-3}O_2)$ is a diepoxyalkyl radical.

Other polyepoxides from the epoxidation of olefinically unsaturated alicyclic compounds are the epoxyalicyclic ethers which correspond to the above-described epoxyalicyclic esters. For example, these have the formula:

$$Z-(CH_2)_n-O-(CH_2)_n-Z$$

where Z and $n$ are as above. They may be obtained by the epoxidation of dicyclopentadiene.

Still other examples of epoxy resins usable in this invention are epoxidized oils such as epoxidized soybean oil, cycloaliphatic diepoxides and epoxidized novolak resins obtained by epoxidizing the condensation products of an aldehyde with a polyhydric phenol.

It is noted that any monoepoxide may be polymerized and any polyepoxide may be cured by adding the metal salt complexes of the imidazoles of this invention and heating, and that the above epoxy resins are intended to be illustrative only. In the preferred embodiments of this invention, the epoxy resins are those having an average of more than one 1,2-epoxy group per average molecular weight.

Pigments such as titanium dioxide, carbon black, and the like, fillers, flexibilizing agents, etc., may be added to the epoxy resin compositions. It is also possible to include in the compositions of this invention other resinous materials co-reactive with epoxy resins such as resins containing carboxyl groups such as azelaic dride, polyesters containing epoxy groups, resins containing hydroxyl groups, thio groups, silicon resins containing epoxy groups such as

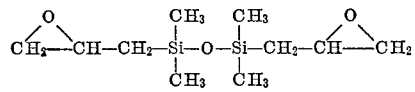

urethane resins, and resins containing amino groups. The addition of the above co-reactants may be used to impart various desirable properties to the epoxy resin compositions.

The ratio of the metal salt complex of an imidazole to the epoxy resin is not critical. Generally, the blend contains from about 0.5 to about 40 parts by weight of metal salt complex to 100 parts by weight of epoxy resin.

When the epoxy resin and the metal salt complex of the imidazole are blended together, the composition may be stored at room temperature for long periods of time without curing. Hence, the composition may be shipped to consumers and stored prior to use. If the epoxy resin is to be used as a sheet material, it may be heated for the period of time necessary to form a hard gelled material. If the epoxy blend is to be used as a coating or adhesive, the blend is coated onto the substrate and then heated for a period of time long enough to cure the resin to a tough adherent coating on the substrate. The amount of heat needed to cure the epoxy blends depends upon the particular components, but generally the blends are heated to approximately 200° F. to 500° F. until the resin cures.

The epoxy blends of this invention are useful as coatings, adhesives, potting compounds, castings and laminates or reinforced products. They are especially useful in that they may be handled commercially as one-part epoxy resins, as compared to epoxy resins which must be handled as separate parts of resin and hardener.

The epoxy resin compositions may be coated on to substrates using any of the conventional coating techniques. The compositions may also be applied as powder coatings by spraying solid mixtures of epoxides and metal salt complexes of imidazoles in powder form on a hot substrate.

The following examples set forth specific embodiments of the instant invention. However, the invention is not to be construed as being limited to these embodiments for there are, of course, numerous possible variations and modifications.

All parts and percentages in the examples, as well as throughout the specification, are by weight unless otherwise indicated.

EXAMPLE 1

A metal salt complex of an imidazole was prepared by adding a solution of 23.8 parts of $NiCl_2 \cdot 6H_2O$ in 80 parts of methanol to a solution of 40.7 parts of imidazole in 40 parts of methanol. The resulting mixture evolved heat and changed color to blue. About one-half of the solvent was evaporated and the residue was diluted with 240 parts of acetone. The solid was filtered off and washed with acetone and dried.. The product was a light violet solid.

The complex of $NiCl_2$ and imidazole obtained was then mixed with an epoxy resin formed by the condensation reaction product of epichlorohydrin and Bisphenol A (Epon 828). Epon 828 is an epoxy resin of the type having the structural formula

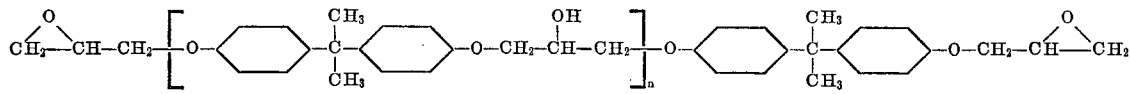

where $n$ represents the number of monomer units in the polymer chain. The uncured resin has a viscosity of 100–160 poises at 25° C. and an epoxide equivalent of 180–195. The blend was a mixture of 0.25 part of the complex and 5.0 parts of the epoxy resin.

The gel time of this resin was determined by heating the resin at 350° F. and the time in which the resin mixture became hard and impenetrable to a wooden applicator was considered to be the gel time of the blend. The blend gelled in 5 minutes and 15 seconds. This was not considerably longer than the gel time of a blend of the same epoxy resin with imidazole alone. The gel time of the latter resin was 1 minute and 30 seconds.

The ability of the imidazole-$NiCl_2$ complex blend with the epoxy resin to remain stable at lower temperatures for a long period of time was measured by the viscosity changes in the blend while left on a shelf at 100° F. The complex blend had an initial viscosity of 13,000 centipoises and after 8 days measured only 15,000 centipoises. This was compared to the stability of the epoxy resin blended only with the imidazole. The latter resin completely gelled after 1 day.

Thus, it is seen that the metal salt complex of imidazole when blended with the epoxy resin gels quickly at 350° F. and can be stored at 100° F. for long periods of time without gelation while the epoxy resin blended only with the imidazole compound gels quickly at 350° F. but also completely gels at 100° F. after only 1 day.

EXAMPLE 2

A solution of 37.5 parts of $CuSO_4 \cdot 5H_2O$ in 100 parts of water was added to a solution of 74.5 parts of 2-ethyl-4-methylimidazole. The mixture was allowed to stand at room temperature for a few hours, and then was filtered. The resulting solid was washed with 240 parts of acetone and dried. The resulting product was in the form of dark blue crystals.

This complex was blended with the same epoxy resin used in Example 1 in the same proportions as in Example 1 and the gel time at 350° F. was determined to be 7.5 minutes and the stability test showed the initial viscosity to be 19,800 centipoises and after 8 days the viscosity was only 22,600 centipoises.

This was compared to the gel time and stability of the epoxy resin blended only with 2-ethyl-4-methylimidazole. This latter resin gelled in 2 minutes at 350° F. but completely gelled in 1 day at 100° F.

EXAMPLE 3

This example illustrates the polymerization of a monoepoxide by adding a metal salt complex of an imidazole and heating.

10.0 parts of phenyl glycidyl ether was added to 0.5 part of a metal salt complex of imidazole consisting of the salt of cupric chloride and imidazole in a molar ratio of 4 moles of imidazole to 1 mole of cupric chloride. The components were mixed together in an aluminum dish and put into an oven at 350° F. After 1 hour and 40 minutes, the aluminum dish was taken out of the oven and cooled to room temperature. The monoepoxide was polymerized to a solid casting.

EXAMPLES 4–80

Various metal salt complexes of imidazoles were prepared using the same method as that employed in Example 1. A number of epoxy resin compositions were produced by blending the complexes with the same epoxy resin used in Example 1 in the same proportions. The compositions of the complexes employed are shown in Table I. All of the blends of epoxy resins with metal salt complexes of imidazoles gelled at 350° F. and were stable for long periods of time at 100° F.

TABLE I.—SALT-IMIDAZOLE COMPLEXES

| Example | Imidazole | Moles | Salt | Moles |
|---|---|---|---|---|
| 4 | Im[1] | 0.4 | $CaCl_2$ | 0.1 |
| 5 | Im | 0.4 | $CuCl_2$ | 0.1 |
| 6 | Im | 0.4 | $CuBr_2$ | 0.1 |
| 7 | Im | 0.4 | $CuF_2$ | 0.1 |
| 8 | Im | 0.6 | $CoCl_2$ | 0.1 |
| 9 | Im | 0.4 | $ZnBr_2$ | 0.1 |
| 10 | Im | 0.4 | $CuSO_4$ | 0.1 |
| 11 | Im | 0.4 | $ZnCrO_4$ | 0.1 |
| 12 | Im | 0.4 | $In(BF_4)_3$ | 0.1 |
| 13 | Im | 0.4 | $Cu(NO_3)_2$ | 0.1 |
| 14 | Im | 0.4 | $HgBr_2$ | 0.05 |
| 15 | Im | 0.4 | $Zr(SO_4)_2$ | 0.1 |
| 16 | EtMeIm[2] | 0.3 | $CuCl_2$ | 0.05 |
| 17 | EtMeIm | 0.3 | $NiCl_2$ | 0.05 |
| 18 | EtMeIm | 0.3 | $ZnCl_2$ | 0.05 |
| 19 | EtMeIm | 0.675 | $ZnBr_2$ | 0.15 |
| 20 | EtMeIm | 0.675 | $CuBr_2$ | 0.15 |
| 21 | EtMeIm | 0.675 | $CuF_2$ | 0.15 |
| 22 | EtMeIm | 0.675 | $Cu(BF_4)_2$ | 0.15 |
| 23 | EtMeIm | 0.3 | $FeCl_2$ | 0.05 |
| 24 | EtMeIm | 0.264 | $MnCl_2$ | 0.066 |
| 25 | EtMeIm | 0.4 | $CdCl_2$ | 0.067 |
| 26 | EtMeIm | 0.650 | $CoCl_2$ | 0.10 |
| 27 | EtMeIm | 0.650 | $SnCl_2$ | 0.10 |
| 28 | EtMeIm | 0.675 | $MnSO_4$ | 0.15 |
| 29 | EtMeIm | 0.450 | Copper malonate | 0.30 |
| 30 | EtMeIm | 0.18 | Copper acetate | 0.16 |
| 31 | EtMeIm | 0.40 | Copper methacrylate | 0.10 |
| 32 | CIm[3] | 0.21 | $CuCl_2$ | 0.05 |
| 33 | CIm | 0.20 | $CuBr_2$ | 0.05 |
| 34 | CIm | 0.20 | $CuF_2$ | 0.05 |
| 35 | CIm | 0.20 | $CuSO_4$ | 0.05 |
| 36 | CIm | 0.216 | $CoCl_2$ | 0.036 |
| 37 | CIm | 0.30 | $NiCl_2$ | 0.050 |
| 38 | 1-MeIm[4] | 0.4 | $CuCl_2$ | 0.1 |
| 39 | 1-MeIm | 0.4 | $CuBr_2$ | 0.1 |
| 40 | 1-MeIm | 0.4 | $CuF_2$ | 0.1 |
| 41 | 1-MeIm | 0.4 | $CuSO_4$ | 0.1 |
| 42 | 2-MeIm[5] | 0.4 | $CuCl_2$ | 0.1 |
| 43 | 2-MeIm | 0.4 | $CuBr_2$ | 0.1 |
| 44 | 2-MeIm | 0.4 | $CuSO_4$ | 0.1 |
| 45 | 2-MeIm | 0.4 | $Cu(NO_3)_2$ | 0.1 |
| 46 | 2-MeIm | 0.4 | $CaCl_2$ | 0.1 |
| 47 | 2-MeIm | 0.4 | $NiSO_4$ | 0.1 |
| 48 | 2-MeIm | 0.4 | $NiF_2$ | 0.1 |
| 49 | 2-MeIm | 0.4 | $CrCl_3$ | 0.1 |
| 50 | 2-MeIm | 0.4 | $NiCl_2$ | 0.1 |
| 51 | 2-MeIm | 0.4 | $CoCl_2$ | 0.1 |
| 52 | 2-MeIm | 0.4 | $AgNO_3$ | 0.1 |
| 53 | $Me_2Im$[6] | 0.4 | $CuCl_2$ | 0.1 |
| 54 | $Me_2Im$ | 0.4 | $CuBr_2$ | 0.1 |
| 55 | $Me_2Im$ | 0.4 | $CuSO_4$ | 0.1 |
| 56 | $Me_2Im$ | 0.4 | $NiCl_2$ | 0.1 |
| 57 | 2-EtIm[7] | 0.4 | $CuCl_2$ | 0.1 |
| 58 | 2-EtIm | 0.4 | $Cu(NO_3)_2$ | 0.1 |
| 59 | 2-EtIm | 0.4 | $CuBr_2$ | 0.1 |
| 60 | 2-EtIm | 0.4 | $CuSO_4$ | 0.1 |
| 61 | 2-EtIm | 0.4 | $NiCl_2$ | 0.1 |
| 62 | 2-EtIm | 0.4 | $NiSO_4$ | 0.1 |
| 63 | BIm[8] | 0.24 | $CuCl_2$ | 0.06 |
| 64 | BIm | 0.20 | $CuBr_2$ | 0.05 |
| 65 | BIm | 0.22 | $CuSO_4$ | 0.055 |
| 66 | BIm | 0.20 | $CoCl_2$ | 0.05 |
| 67 | BIm | 0.20 | $NiCl_2$ | 0.05 |
| 68 | BMeIm[9] | 0.24 | $CuCl_2$ | 0.06 |
| 69 | BMeIm | 0.22 | $CuSO_4$ | 0.055 |
| 70 | VMeIm[10] | 0.30 | $CuCl_2$ | 0.075 |
| 71 | VMeIm | 0.30 | $CuSO_4$ | 0.075 |
| 72 | AlEtMeIm[11] | 0.21 | $CuCl_2$ | 0.05 |
| 73 | AlEtMeIm | 0.21 | $CuBr_2$ | 0.05 |
| 74 | AlEtMeIm | 0.21 | $CuSO_4$ | 0.05 |
| 75 | ImC[12] | 0.24 | $CuCl_2$ | 0.06 |
| 76 | ImC | 0.24 | $NiCl_2$ | 0.06 |
| 77 | MeImC[13] | 0.16 | $CuCl_2$ | 0.04 |
| 78 | TosIm[14] | 0.12 | $CuCl_2$ | 0.03 |
| 79 | Im-Ac[15] | 0.40 | $CuCl_2$ | 0.10 |
| 80 | Im-HEA[16] | 0.40 | $CuCl_2$ | 0.10 |

Following is an explanation of the superscript numbers in Table I:
[1] Im = Imidazole.
[2] EtMeIm = 2-ethyl-4-methylimidazole.
[3] CIm = 1-(2-carbamylethyl)imidazole.
[4] 1-MeIm = 1-methylimidazole.
[5] 2-MeIm = 2-methylimidazole.
[6] $Me_2Im$ = 1,2-dimethylimidazole.
[7] 2EtIm = 2-ethylimidazole.
[8] BIm = Benzimidazole.
[9] BMeIm = 1-benzyl-2-methylimidazole.
[10] VMeIm = 1-vinyl-2-methylimidazole.
[11] AlEtMeIm = 1-allyl-2-ethyl-4-methylimidazole.
[12] ImC = 1-imidazolecarboxanilide.
[13] MeImC = 2-methyl-1-imidazolecarboxanilide.
[14] TosIm = 1-(p-toluenesulfonyl)imidazole.
[15] Im-AC = Adduct of imidazole and acrylic acid.
[16] Im-HEA = Adduct of imidazole and hydroxyethyl acrylate.

EXAMPLES 81–91

These examples illustrate the use of metal salt complexes of imidazoles as curing agents for different types of epoxy resins. Table II shows the gel times of the different metal salt complexes of imidazoles and several epoxy resins.

The blends are made by merely mixing 0.25 part of the complex with 5.0 parts of the epoxy. The gel times were determined by heating the blends at 350° F. until the resin mixture becomes hard and impenetrable to a wooden applicator. The abbreviations used for the imidazoles are the same as those used in Table I.

Epoxy A is the condensation product of epichlorhydrin and Bisphenol A (Epon 828), Epoxy B is a dimer fatty acid diglycidyl ester (Epon 871), Epon 871 is a low viscosity aliphatic polyepoxide having an epoxide equivalent of 390–470 and a viscosity at 25° C. of 4–9 poises. Epoxy C is a cycloaliphatic epoxide of the formula:

$$\underset{O}{\triangle}\hspace{-1em}\diagdown\hspace{-0.3em}-CH_2OCO-\diagup\hspace{-1em}\underset{O}{\triangle}$$

(Ciba CY 179), and Epoxy D is an epoxidized novolak resin of the formula:

$$\left[\begin{array}{c}OCH_2CH\overset{O}{\diagup\diagdown}CH_2 \\ CH_3-\bigcirc \end{array}\right]_1 \left[\begin{array}{c}OCH_2CH\overset{O}{\diagup\diagdown}CH_2 \\ \bigcirc \\ CH_2- \end{array}\right]_2 \begin{array}{c}OCH_2CH\overset{O}{\diagup\diagdown}CH_2 \\ CH_3-\bigcirc \end{array}$$

(Ciba ECN 1280).

TABLE II.—COMPARISON OF GEL TIMES OF EPOXY RESINS WITH SELECTED IMIDAZOLE COMPLEXES

| | Complex | | | | Gel time (hours) | | | |
|---|---|---|---|---|---|---|---|---|
| | Salt | Moles | Imidazole | Moles | Epoxy A | Epoxy B | Epoxy C | Epoxy D |
| Example: | | | | | | | | |
| 81 | $CuCl_2$ | 0.10 | Im | 0.40 | 0.03 | 2.83 | 2.33 | 5.25 |
| 82 | $CuF_2$ | 0.10 | 1-MeIm | 0.40 | 0.05 | 1.17 | 0.26 | 0.07 |
| 83 | $CuCl_2$ | 0.10 | 2-MeIm | 0.40 | 3.5 | 2.17 | 1 | 2.83 |
| 84 | $NiCl_2$ | 0.10 | 1,2-Me$_2$Im | 0.40 | 0.06 | 0.83 | 5.75 | 0.10 |
| 85 | $CuBr_2$ | 0.15 | 2-EtIm | 0.675 | 5.5 | 2.83 | 1.25 | 2.83 |
| 86 | $NiCl_2$ | 0.05 | EtMeIm | 0.30 | 0.07 | 1.83 | 5.17 | 3.5 |
| 87 | $CuF_2$ | 0.05 | ClIm | 0.20 | 0.11 | 2.83 | 0.42 | 0.08 |
| 88 | $CuCl_2$ | 0.05 | BIm | 0.20 | 0.67 | 1.17 | 3.33 | 5.25 |
| 89 | $CuSO_4$ | 0.055 | BMeIm | 0.22 | 0.22 | 2.83 | 4 | 4.25 |
| 90 | $CuCl_2$ | 0.05 | AlEtMeIm | 0.21 | 0.11 | 2.17 | 5.75 | 1.58 |
| 91 | $CuCl$ | 0.06 | ImC | 0.24 | 0.06 | 1.17 | 1 | 3.5 |

As seen by the above table of results, the imidazole complexes produce a convenient gel with different types of epoxy resins at 350° F.

According to the provisions of the patent statutes, there are described above the invention and what is considered its best embodiments. However, within the scope of the appended claims, it is to be understood that the invention may be practiced otherwise than as specifically described.

We claim:

1. A curable epoxy resin composition comprising an epoxy resin having an average of more than 1.0 1,2-epoxy groups per average molecular weight and a metal salt complex of an imidazole wherein the metal salt contains a metal selected from Groups I–B, II–A, II–B, III–A, IV–A, IV–B, V–A, V–B, VI–B, VII–B and VIII of the periodic chart of the elements wherein the composition comprises from about 0.5 to about 40 percent by weight of metal salt complex based on the weight of epoxy resin.

2. The composition of claim 1 wherein the imidazole is 2-ethyl-4-methylimidazole.

3. The composition of claim 1 wherein the imidazole is imidazole.

4. The composition of claim 1 wherein the imidazole is 2-methylimidazole.

5. The composition of claim 1 wherein the imidazole is 2-ethylimidazole.

6. The composition of claim 1 wherein the epoxy resin is a mono-epoxide.

7. The composition of claim 1 where the imidazole is an addition product with alpha, beta ethylenically-unsaturated compounds.

8. The composition of claim 1 wherein the complex has a metal salt/imidazole ratio of from 1:1 to 1:6.

9. The composition of claim 1 wherein the epoxy resin has more than 1.0 functional epoxy groups per average molecular weight.

10. The composition of claim 9 wherein the epoxy resin is a polyglycidyl ether of a polyphenol.

11. The composition of claim 9 wherein the epoxy resin is a polyglycidyl ester of a polycarboxylic acid.

12. The composition of claim 9 wherein the epoxy resin is derived from the epoxidation of an olefinically-unsaturated aliphatic compound.

References Cited

UNITED STATES PATENTS

| 2,803,609 | 8/1957 | Schlenker. |
| 3,030,376 | 4/1962 | Liggett et al. |
| 3,394,105 | 7/1968 | Christie. |
| 3,018,262 | 1/1962 | Schroeder. |

FOREIGN PATENTS

| 1,084,667 | 9/1967 | Great Britain. |

WILLIAM H. SHORT, Primary Examiner

T. E. PERTILLA, Assistant Examiner

U.S. Cl. X.R.

117—161 ZB; 161—184; 252—431 N; 260—2 N, 2 A, 18 Ep, 37 Ep, 47 Ep, 47 EN, 51 Ep, 59, 78.4 Ep, 88.3 A, 309, 830 R